March 17, 1953  C. GROB  2,632,024
PROCESS FOR THE MANUFACTURE OF SUBSTITUTED TETRALONES
Filed Sept. 23, 1949
I
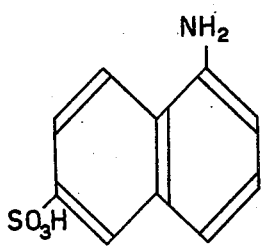
II
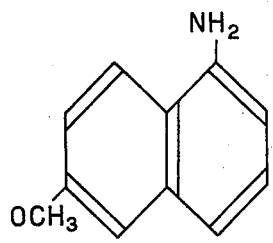
III
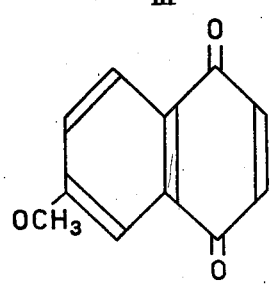
IV
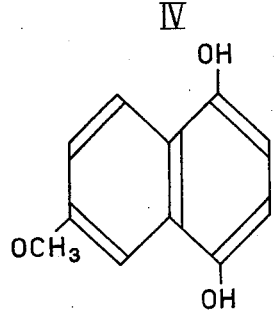
V
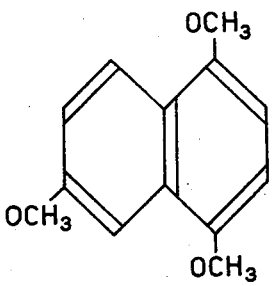 = 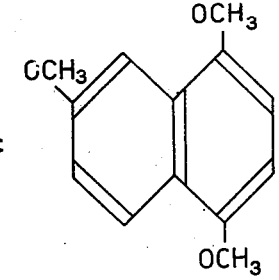
VI
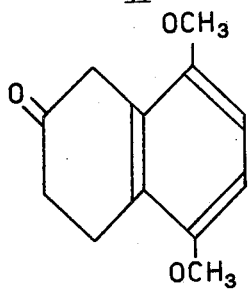
Inventor
Cyril Grob Patented Mar. 17, 1953

2,632,024

UNITED STATES PATENT OFFICE 2,632,024

PROCESS FOR THE MANUFACTURE OF SUBSTITUTED TETRALONES

Cyril Grob, Basel, Switzerland, assignor to Organon Inc., Orange, N. J., a corporation of New Jersey Application September 23, 1949, Serial No. 117,485
In the Netherlands October 2, 1948

8 Claims. (Cl. 260—590)

The invention relates to a process for the manufacture of substituted tetralones.

Tetralones can be derived from tetraline in which an oxygen atom is attached to the hydrogenated nucleus. α and β tetralones are distinguished in the same manner as α and β substituted naphthalenes are distinguished.

The invention relates particularly to the manufacture of a substituted β tetralone, namely the dimethoxy-5.8 tetralone-2. To this appertains the Formula VI of the annexed drawing. This substance is an important intermediate product in the synthesis of steroids. In the rest of this specification this substance will be spoken of, but it will be clear that within the scope of the invention one is not limited to methoxy-groups but that also other alkyloxy groups or acyloxy groups may be present instead of the methoxy group.

For this purpose e. g. methoxy-6 naphthoquinone-1.4 (III) is used as a starting material. This substance can e. g. be prepared from Cleve-acid (I), this is converted in known manner into methoxy-6 naphthyl-1 amine (II), as described a. o. by A. Butenandt and G. Schramm, Ber. 68, 2085 (1935) or W. E. Bachmann, W. Cole and A. L. Wilds, J. A. C. S. 62, 824 (1940). Analogous to the method of H. E. Fierz-David, L. Blangey and W. von Kranichfeld (Helv. Chim. Acta 30, 832 (1947)) (II) is converted into methoxy-6 naphthoquinone-1.4 (III).

The methoxy-6 naphthoquinone-1.4 (III) is reduced with Raney nickel in benzene to dihydroxy-1.4 methoxy-6 naphthalene (IV) which by methylation is converted in known manner into trimethoxy-1.4.6. naphthalene (V). The conversion of III to IV by reduction with Raney nickel in benzene was not self-evident. It was already known, it is true, to reduce dimethyl-2.3 dimethoxy-6.7 naphthoquinone-1.4 with Raney nickel in methanol (J. A. C. S. 66, 1315 (1944)) but here the reduction of III with Raney nickel in methanol, ethanol or ether does not yield a satisfying result; on the contrary this reduction surprisingly succeeds smoothly in benzene. When further e. g. III is reduced with zinc dust in glacial acetic acid the diacetate of dihydroxy-1.4 methoxy-6 naphthalene is smoothly obtained but it is not possible to convert this substance into IV.

The conversion of trimethoxy-1.4.6 naphthalene (V) into the desired final product: dimethoxy-5.8 tetralone-2 (VI) is performed by sodium in alcohol or sodium and alcohol in liquid ammonia via the enol compound (vide Cornforth, Cornforth and Robinson, Soc. 1942, 689; Soc. 1946, 676; Birch, Soc. 1944, 430).

The invention must be seen in the indication of the entire process from e. g. methoxy-6 naphthoquinone-1.4 to the substituted tetralone in partially known, partially, however, unknown manners. What was said for the methoxy compounds applies in full to all naphthoquinones-1.4 substituted by an alkoxy or an acyloxy group in the 5 or 6 position.

EXAMPLE 1.5 g. of the methoxy-6 naphthoquinone-1.4 (M. P. 134–135° C.) obtained in known manner from Cleve-acid are dissolved in 100 cm.³ of pure benzene and hydrogenated during 2 hours with Raney nickel (obtained from 1.5 g. of Ni-Al-alloy) at room temperature. Towards the end the hydrogenation is interrupted for a moment and some ether is added to dissolve the separated hydroquinone. After 2½ hours the taking up of hydrogen is ended, 190 cm.³ being taken up (theoretically 186 cm.³). The reduction liquid which has a pale yellowish colour is filtered and washed with ether-benzene. The filtrate is somewhat darkly colored, it is evaporated in vacuo till dryness. A grey-white mass is obtained. A specimen recrystallized from ether-petroleumether has a melting point of 148–150° C. (by sublimation yellow needles can be obtained herefrom with a melting point of 89–90° C.; probably there are here two modifications of the same substance). 1.5 g. of crude methoxy-6 naphthohydroquinone-1.4 are obtained which is methylated in known manner, e. g. according to O. Fischer and C. Bauer, J. pr. Chem. II, 94, 2 (1917). The trimethoxy-1.4.6. naphthalene obtained in this manner distills under a pressure of 0.2 mm. at 140–141° C. The picrate of this compound melts at 148–149° C.

A. Reduction with sodium and alcohol 0.7 g. of the above obtained trimethoxy-1.4.6 naphthalene are dissolved in 8 cm.³ of absolute alcohol and within 10 minutes 1.1 g. of finely cut sodium metal is thrown in through the reflux cooler. The orange colored liquid is heated for approximately 30 minutes in a bath of 115–120° C.; the sodium then has disappeared. The solution is cooled, diluted with 10 cm.³ of water and immediately 10 cm.³ of strong hydrochloric acid are added. The solution is heated on the waterbath for 20 minutes and now and then shaken, the alcohol is evaporated in vacuo, some water is added and the product is subjected four times to extraction by means of ether. The ether solution is three times washed with water, evaporated to 5 cm.³ and shaken with 5 cm.³ of a freshly prepared concentrated sodiumbisulfite solution. After 5 minutes a white crystalline precipitate results which after some time is sucked off and washed with ether. The bisulfite compound is decomposed in the usual manner, a yield of 60% of the desired tetralone being obtained with a melting point of 89–95° C. By molecular sublimation dimethoxy-5.8 tetralone-2 with a melting point of 99–100° C. is obtained. This substance dissolves well in benzene, in warm alcohol and ether and poorly in petroleumether. The semicarbazone has a melting point of 203–207° C., it dissolves well in chloroform, methylenechloride, warm methanol and acetone.

B. *Reduction with sodium and alcohol in liquid ammonia*

0.55 g. of trimethoxy-1.4.6 naphthalene are dissolved in 0.6 cm.³ of alcohol and while cooling with Dry Ice yet 10 cm.³ of liquid ammonia are added. While shaking 500 mg. of sodium are added and the solution is left alone while cooling still for 5 hours after the blue color having disappeared. At room temperature the ammonia is allowed to evaporate and the residues are removed in a vacuum. Thereupon some alcohol is added, 5 cm.³ of water and finally 5 cm.³ of strong hydrochloric acid. The reaction mixture is then further worked up as indicated under A.

When it is tried to carry out the above described reduction of methoxy-6 naphthoquinone-1.4 with Raney nickel in ether solution one does not obtain the desired product. When it is desired to convert the methoxy-6 naphthoquinone-1.4 via the diacetate into the hydroquinone, one encounters the difficulty that from the diacetate only unimportant quantities of the desired final product can be obtained.

Having now particularly described and ascertained the nature of my said invention and in what manner same is to be performed what I claim is:

1. As a new compound, dialkoxy-5.8 tetralone-2.
2. As a new compound, dimethoxy-5.8 tetralone-2.
3. The method of preparing dialkoxy-5,8-tetralone-2 compounds comprising hydrogenating an alkoxy-6-naphthoquinone-1.4 compound in benzene solution in the presence of Raney nickel to an alkoxy-6-naphthohydroquinone-1,4 compound, alkylating the hydroxyl groups in said naphthohydroquinone compound, and reducing the resulting trialkoxy-1,4,6-naphthalene compound by means of an alkali metal and alcohol to the corresponding dialkoxy-5,8-tetralone-2 compound.
4. The method of preparing dimethoxy-5,8-tetralone-2, comprising hydrogenating methoxy-6-naphthoquinone-1,4 in benzene solution in the presence of Raney nickel to methoxy-6-naphthohydroquinone-1,4, methylating the hydroxyl groups in said naphthohydroquinone compound, and reducing the resulting trimethoxy-1,4,6-naphthalene by means of an alkali metal and alcohol to the corresponding dimethoxy-5,8-tetralone-2.
5. The method according to claim 3, wherein the reduction by means of an alkali metal and alcohol is carried out in liquid ammonia.
6. The method according to claim 4, wherein the reduction by means of an alkali metal and alcohol is carried out in liquid ammonia.
7. In a method of preparing dialkoxy-5,8-tetralone-2 compounds by hydrogenating an alkoxy-6-naphthoquinone-1,4 compound to an alkoxy-6-naphthohydroquinone-1,4 compound, alkylating the hydroxyl groups in said naphthohydroquinone compound, and reducing the resulting trialkoxy-1,4,6-naphthalene compounds by means of an alkali metal and alcohol to the corresponding dialkoxy-5,8-tetralone-2 compound, the step comprising hydrogenating said alkoxy-6-naphthoquinone-1,4 compound in benzene solution in the presence of Raney nickel.
8. In a method of preparing dimethoxy-5,8-tetralone-2 by hydrogenating methoxy-6-naphthoquinone-1,4 to methoxy-6-naphthohydroquinone-1,4, methylating the hydroxyl groups in said naphthohydroquinone, and reducing the resulting trimethoxy-1,4,6-naphthalene by means of an alkali metal and alcohol to the corresponding dimethoxy-5,8-tetralone-2, the step comprising hydrogenating said methoxy-6-naphthoquinone-1,4 in benzene solution in the presence of Raney nickel.

CYRIL GROB.

REFERENCES CITED

The following references are of record in the file of this patent:

UNITED STATES PATENTS

| Number | Name | Date |
|---|---|---|
| 1,967,862 | Carothers et al. | July 24, 1934 |

FOREIGN PATENTS

| Number | Country | Date |
|---|---|---|
| 397,150 | Germany | June 14, 1924 |

OTHER REFERENCES

Fischer, J. fur. Praktische Chemie, N. F., vol. 94, pp. 1–12 (1916).

Cornforth et al., J. Chem. Soc., 1942 vol., pp. 689–91.

Cornforth et al., J. Chem. Soc., 1946 vol., pp. 676–679.

Grob et al., Helv. Chim. Acta, vol. 31, pp. 1691–1706 (Oct. 15, 1948).

Grob et al., Helv. Chim. Acta, vol. 31, pp. 1706–13 (Oct. 15, 1948).